Aug. 11, 1953

M. BERLAND ET AL 2,648,517

VALVE

Filed Dec. 9, 1949

Morton Berland
Melvin Spiegler
INVENTORS.

BY Clarence A. O'Brien
and Harvey B. Jacobson
Attorney

Patented Aug. 11, 1953

2,648,517

UNITED STATES PATENT OFFICE 2,648,517

VALVE

Morton Berland and Melvin Spiegler,
St. Paul, Minn.

Application December 9, 1949, Serial No. 132,072

2 Claims. (Cl. 251—6)

This invention relates to the class of valves, and more particularly a valve adapted to be secured to a drum, hogshead, barrel or the like.

An object of this invention is to provide a novel construction of a valve for controlling the discharge of a fluid from a drum or other similar container.

A further object of the invention is to provide means for insuring the closure of a valve of a drum or the like and including means for preventing the opening thereof.

Still further objects of the invention reside in the provision of a valve for a drum that is quick acting while being made from a minimum of moving parts.

Additional objects of the invention reside in the provision of a valve for a drum that is strong, durable, highly efficient in operation, simple in construction and manufacture, adapted to be securely placed on a drum, barrel, hogshead or the like, and which is easy to manufacture and therefore quite inexpensive.

These, together with the various ancillary objects of the invention which will become apparent as the following description proceeds, are attained by this novel valve, a preferred embodiment of which has been illustrated in the accompanying drawings, by way of example only, wherein.

Figure 1:
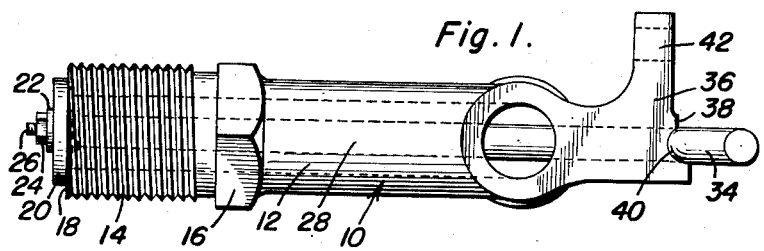
Figure 1 is a bottom plan view of the invention.
Figure 2:
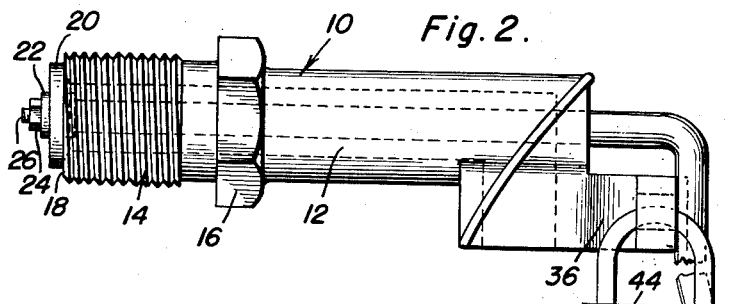
Figure 2 is a side elevational view of the valve shown in a closed position.

With continuing reference to the accompanying drawings wherein like reference numerals designate similar parts throughout the various views, reference numeral 10 generally designates a casing comprising one main element of the invention. The casing is formed from a substantially right angle elbow shaped pipe or tube and thusly a central substantially L-shaped passageway 12 is formed therethrough to provide a fluid delivery passage for the valve.

The end 14 is suitably threaded for ready engagement with a valve, hogshead, or a drum and a hexagonal nut 16 is cast on the casing so that the valve may be turned into secure engagement with the receptacle with which it is to be used.

The face of the end 14 is machined as at 18 to provide a valve seat for substantially watertight engagement with a valve head 20 which is secured by means of stop 22 and nut 24 to the threaded end 26 of a longitudinally extending valve rod 28 which is slidably mounted and emplaced in the passageway 12.

The rod 28 passes through an aperture 30 in the end wall 32 of the casing 10 and the rod 28 is bent to form an angularly divergent portion 34 which is adapted to engage a projection 36 integrally formed with the casing 10. The projection 36 is provided with a portion 38 having a raised surface and an arcuate insert portion 40 for retaining reception of the bent portion 34 of the rod 28. It can be readily seen that the rod portion 34 may be pressed into the arcuate portion 40 in a snap like engagement therewith.

Figure 4:
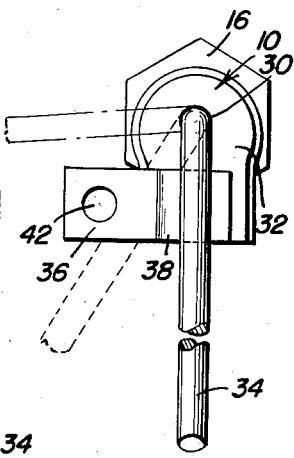
Figure 4 is a front elevational view schematically showing the various positions of the valve.
Figure 5:
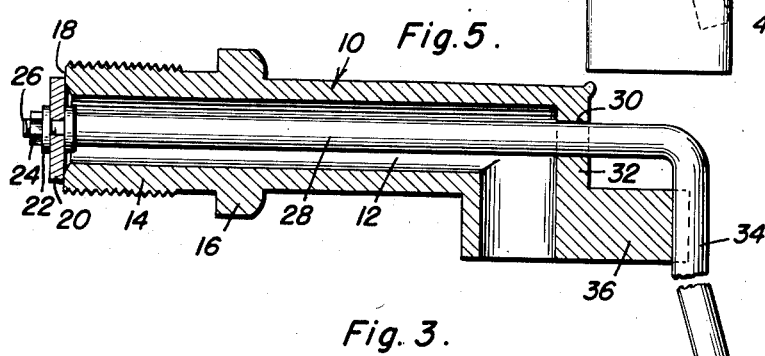
Figure 5 is a vertical sectional view as taken along the longitudinal axis of the valve.
Figure 3:
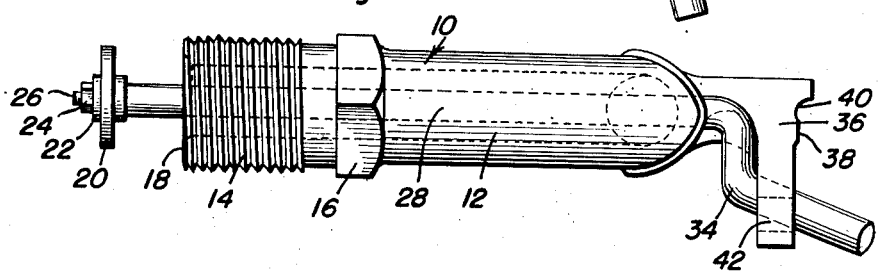
Figure 3 is a top plan view of the invention shown with the valve in an open position.

When the rod portion 34 is engaged over the projection 36 it will cause the valve head 20 to abut against the valve seat 18 to provide a substantially fluid tight seal. When the rod portion 34 is released from the projection 36 it may be rotated as shown by dotted lines in Figure 4 and thence pushed inwardly so as to disengage the valve head 20 from the valve seat 18 as is best shown in Figure 3.

An aperture 42 is provided through the projection 36 for reception of a padlock 44 or the like for locking the valve in a closed position.

Since from the foregoing, the construction and advantages of this valve are readily apparent, further description is believed to be unnecessary.

However, since numerous modifications will readily occur to those skilled in the art after a consideration of the foregoing specification and accompanying drawings, it is not intended to limit the invention to the precise embodiment shown and described, since it is within the concept thereof to modify the outward appearance thereof in any suitable manner, and since suitable modifications and equivalents which fall within the scope of the claims are desired to be protected.

Having described the invention, what is claimed as new is:

1. In combination with an elongated casing having a valve seat at its inner end and having an opening at its outer end, a valve rod extending axially through said casing and having its ends terminating exteriorly of said casing, a valve head secured to the inner end of said rod and seating in said valve seat, the outer end of said rod being angulated and forming a handle for said valve rod, said rod being axially slidable in said casing, an L-shaped projection on the outer end of said casing, one leg of said projection extending transversely of said casing, the other leg of said projection projecting beyond the outer end of said casing and spacing said one leg from said casing, said one leg having a pair of spaced ridges on its outer surface adjacent the junction of said legs and having a transverse bore therethrough adjacent its free end, said handle removably and rotatably seating between said ridges to seat said valve head, said transverse bore being adapted to receive a lock for preventing removal of said handle.

2. The combination of claim 1 wherein one of said ridges is larger than the other whereby the handle can be removed from its seat by rotation in one direction, said larger ridge being the one furthest from the free end of said one leg.

MORTON BERLAND.
MELVIN SPIEGLER.

References Cited in the file of this patent

UNITED STATES PATENTS

| Number | Name | Date |
|---|---|---|
| 4,419 | Clarke | Mar. 14, 1846 |
| 93,222 | Palmer | Aug. 3, 1869 |
| 519,049 | Spofford | May 1, 1894 |
| 576,068 | O'Lally | Jan. 26, 1897 |
| 972,826 | Cordley et al. | Oct. 18, 1910 |
| 1,059,953 | Thorman | Apr. 22, 1913 |
| 1,308,913 | Mingst | July 8, 1919 |
| 1,503,132 | Prator | July 29, 1924 |
| 1,709,325 | Runser | Apr. 16, 1929 |
| 1,888,130 | Hoffman | Nov. 15, 1932 |